(12) United States Patent
Adler et al.

(10) Patent No.: US 11,248,700 B2
(45) Date of Patent: Feb. 15, 2022

(54) SHIFTING ACTUATOR

(71) Applicant: Schaeffler Technologies AG & Co. KG, Herzogenaurach (DE)

(72) Inventors: Dieter Adler, Schönwald (DE); Adrian Husu, Brasov (RO); Stephan Ruffershöfer, Dachsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 291 days.

(21) Appl. No.: 16/472,244

(22) PCT Filed: Nov. 27, 2017

(86) PCT No.: PCT/DE2017/101025
§ 371 (c)(1),
(2) Date: Jun. 21, 2019

(87) PCT Pub. No.: WO2018/113821
PCT Pub. Date: Jun. 28, 2018

(65) Prior Publication Data
US 2021/0131558 A1 May 6, 2021

(30) Foreign Application Priority Data

Dec. 21, 2016 (DE) .................. 102016015212.5

(51) Int. Cl.
| F16H 63/30 | (2006.01) |
| F16H 61/32 | (2006.01) |
| F16H 63/32 | (2006.01) |
| F16H 61/28 | (2006.01) |

(52) U.S. Cl.
CPC .......... *F16H 63/304* (2013.01); *F16H 61/32* (2013.01); *F16H 63/32* (2013.01); *F16H 2061/2884* (2013.01); *F16H 2063/3063* (2013.01)

(58) Field of Classification Search
CPC ........ F16H 63/304; F16H 61/32; F16H 63/32; F16H 2061/2884; F16H 2063/3063
USPC .......................................................... 74/335
See application file for complete search history.

(56) References Cited

U.S. PATENT DOCUMENTS

| 5,492,036 | A | * | 2/1996 | Sato | .................... F16H 25/2219 74/89.36 |
| 7,350,434 | B2 | * | 4/2008 | Nishimura | .......... F16C 33/3706 74/424.82 |
| 8,776,629 | B2 | * | 7/2014 | Bowen | .................... F16D 21/06 74/330 |

(Continued)

FOREIGN PATENT DOCUMENTS

| CN | 1551957 A | 12/2004 |
| CN | 201723695 U | 1/2011 |
| CN | 104329455 A | 2/2015 |

(Continued)

*Primary Examiner* — Ha Dinh Ho
(74) *Attorney, Agent, or Firm* — Matthew Evans

(57) ABSTRACT

A shifting actuator for a transmission including a ball screw drive, having an electric-motor-driven threaded spindle, a multi-part spindle nut, and rolling elements, namely balls, which roll between the threaded spindle and the spindle nut. The nut body has a ball groove, in which there roll balls that are also in contact with the threaded spindle, and is within the sleeve. The shift fork protrudes from the sleeve and is fixed relative to the sleeve and to the main nut body.

9 Claims, 3 Drawing Sheets

(56) References Cited

U.S. PATENT DOCUMENTS 8,991,582 B2 * 3/2015 Eguchi .................. F16D 28/00
192/84.6

FOREIGN PATENT DOCUMENTS

| | | |
|---|---|---|
| CN | 204156660 U | 2/2015 |
| CN | 104813058 A | 7/2015 |
| CN | 105240520 A | 1/2016 |
| DE | 102006026977 A1 | 1/2007 |
| DE | 102006019252 A1 | 10/2007 |
| DE | 102009030010 A1 | 12/2010 |
| DE | 10297160 B4 | 11/2015 |
| EP | 1114263 B1 | 7/2001 |
| EP | 2913563 A1 | 9/2015 |
| FR | 2900714 A1 | 11/2007 |

* cited by examiner

SHIFTING ACTUATOR

CROSS-REFERENCE TO RELATED APPLICATIONS

This application is the U.S. National Phase of PCT Appln. No. PCT/DE2017/101025 filed Nov. 27, 2017 which claims priority to DE102016015212.5 filed Dec. 21, 2016, the entire disclosures of which are incorporated by reference herein.

TECHNICAL FIELD

The disclosure relates to an electromechanically operating shifting actuator suitable for a change-speed transmission, in particular an automated transmission, e.g. a double clutch transmission, of motor vehicle.

BACKGROUND

An electric-motor actuator system for double clutch transmissions is known from DE 10 2006 019 252 A1, for example. This actuator system operates with a ball screw drive and is suitable for the actuation of both wet and dry double clutches.

A shifting actuator known from EP 1 114 263 B1 for an electromechanically actuated automatic transmission, namely a double clutch transmission, comprises a plurality of selector devices, each of which has an electric motor mounted on a reduction gear mechanism. A shift flange and a shift fork are respectively mounted on a plurality of shift rails of the shift actuator.

Electromechanical actuators can also be used in hybrid drive units. Attention is drawn by way of example in this context to EP 2 913 563 A1, which discloses a vehicle that has an internal combustion engine, a change-speed transmission and an electric motor, wherein a manually actuatable selecting element interacts both with the change-speed transmission and with the electric vehicle drive.

As an alternative to electric-motor actuation of a shifting actuator, a hydraulic actuating system is possible in a manner which is likewise fundamentally known. An example of a hydraulically actuated shifting actuator is disclosed in DE 10 2006 026 977 A1.

SUMMARY

The shifting actuator includes a ball screw drive, which comprises an electric-motor-driven threaded spindle, a multi-part spindle nut, and rolling elements, namely balls, which roll between the threaded spindle and the spindle nut. The spindle nut is assembled from a sleeve, a main nut body, and a shift fork, which is provided for direct interaction with further components of a change-speed transmission. The main nut body has a ball groove, in which there roll balls that are also in contact with the threaded spindle, and is fully within the sleeve. In contrast, the shift fork protrudes from the sleeve, wherein it is fixed relative to the sleeve and to the main nut body.

By virtue of the holding of the shift fork in the sleeve, the spindle nut is designed as a compact module which, in addition to its basic function performed in interaction with the threaded spindle, i.e. the conversion of a rotation into a linear motion, also performs an additional function, namely the direct actuation of a transmission element by means of the shift fork, which is rigidly connected to the other components of the spindle nut. The various spindle nut components connected rigidly to one another, i.e. the main nut body, the shift fork, the sleeve and any further parts, e.g. deflection elements and/or shims, are preferably fixed relative to one another by positive and/or frictional engagement. Additional fixing elements, e.g. in the form of screws, bolts or rivets, are not required. Despite the absence of such fixing elements, a very wide variety of forces, especially forces acting in the longitudinal direction of the ball screw drive and tilting forces, can be transmitted between the shift fork and the other components of the spindle nut.

In an embodiment which is particularly advantageous in terms of manufacturing technology, the shift fork and the main nut body are fixed in the sleeve exclusively by means of said sleeve. In this case, the shift fork and the main nut body preferably interact positively with the sleeve, both as regards fixing in the circumferential direction and fixing in the axial direction. Design of the main nut body as a dihedron is particularly advantageous. In this form, a flat foot of the shift fork is preferably placed on a lateral surface of the main nut body, while, on the opposite side of the main nut body, an elongate pocket extending in the longitudinal direction of the ball screw can be formed by the sleeve. The edge of such a pocket can be formed by an encircling strip formed integrally on the sleeve. The pocket, which extends in the radial direction of the spindle nut as far as the main nut body, can be used to insert a mounting foot or as an anti-rotation contour, for example.

In applications in which short strokes of the spindle nut are sufficient, the ball screw drive of the shifting actuator can be configured as a screw drive without rolling element recirculation. For relatively large strokes, on the other hand, configuration of the ball screw drive as a screw drive with ball recirculation is advantageous. In this case, the spindle nut preferably comprises two annular deflection elements, also referred to as end deflectors, arranged at the two ends of the main nut body. Parting planes between the main nut body and the two deflection components are arranged parallel to one another and normally with respect to the center line of the ball screw drive. Projecting from these parting planes there are optionally sections of the deflection components which serve to discharge the balls from the load section and recirculate the balls into the load section. In a preferred embodiment, the deflection elements, also referred to as deflection components, which rest flat against the main nut body do not project in the axial direction into the nut thread of the main nut body.

The transfer of the balls between a screw-shaped load channel, which is formed between the threaded spindle and the main nut body of the threaded spindle, and a deflection element takes place in the tangential direction of the ball channel. With the aid of a return channel, which is integrated into the spindle nut, the ball channel, which comprises sections in both deflection elements, is closed.

To fix the main nut body, on the one hand, and the deflection elements, on the other hand, within the sleeve, separate deformation regions of the sleeve are provided in a preferred embodiment, said regions fixing the main nut body and the deflection elements in the axial direction. In this case, the deformation regions, which hold the main nut body in the sleeve, are more extended in the axial direction in a preferred embodiment than those deformation regions which fix one of the deflection elements in the same direction in the sleeve. The deformation regions which fix the main nut body in the axial direction within the sleeve are preferably designed as beads which overlap the main nut body in the radial direction.

The sleeve, which surrounds the remaining part of the spindle nut, is preferably a metal parts with thin walls in comparison with the main nut body. It is expedient if the sleeve can be produced as a punched and bent part or as a drawn part, for example. By means of surface contacts between the sleeve and the main nut body, combined with stop contours produced by forming, which are effective in the axial direction of the spindle nut, a permanently stable joint between the said components of the spindle nut is nevertheless provided.

The ball screw drive of the shifting actuator can expediently be produced in the following steps:

supply of a threaded spindle and of two annular deflection components, i.e. end deflectors, which are preferably manufactured from plastic, supply of a shift fork, which is preferably separated from a rolled drawn profile or manufactured as a sintered part, for example, production of a spindle nut profile from metal, which has at least one recess extending parallel to the longitudinal axis of this profile, either in the form of a longitudinal groove in the circumferential surface thereof or in the form of a through hole, production of a screw-shaped ball groove in the spindle nut profile by cutting and/or non-cutting methods, cutting the spindle nut profile to length, i.e. dividing the spindle nut profile into a plurality of sections, preferably of the same length, production of a main nut body by reworking a section of the spindle nut profile, in particular finish-machining the front ends of the longitudinal groove or through hole, forming a main sleeve body from sheet metal, final assembly of the main sleeve body with the main nut body, the shift fork and the deflection components as well as a number of rolling elements, namely balls, and the threaded spindle to give a ball screw drive, wherein sections of the main sleeve body are deformed in such a way that both the deflection components and the main nut body, together with the shift fork placed against the latter, are fixed in the spindle nut sleeve formed from the main sleeve body by deformation and that the recess of the main nut body forms a return section of a closed ball channel.

The recess in the main nut body, which is in the form of a longitudinal groove or a through hole and forms a ball channel section extending parallel to the center line of the ball screw drive, is thus already present in an intermediate product, namely the spindle nut profile, which still has to be divided into a plurality of individual pieces, from each of which a spindle nut is formed. Expensive production of the recess, i.e. of the return section, by machining is thus eliminated. Manufacturing steps such as the production of the screw-shaped ball groove can take place either before the spindle nut profile is cut to length or only on the individual main nut body. It is likewise possible to carry out rough machining initially on the entire spindle nut profile and to perform fine machining on the individual main nut body at a later stage of manufacture. In principle, any cutting and non-cutting methods known per se, e.g. roller forming, are suitable for the production of the thread length of the spindle nut and of the threaded spindle. In all cases, there is a rationalization effect from the preprofiling of the main nut body, which takes place in an upstream manufacturing stage, namely that of the shaping of the spindle nut profile.

Rolling bearing steel is suitable for the manufacture of the spindle nut profile and hence also of the main nut body. The spindle nut, including the shift fork fixed on all axes relative to the main nut body, is guided in a linearly movable manner secured against rotation, wherein the range of movement is defined by means of a pocket with integrally formed strips and a stop is provided, for example, with the aid of pin fixed in the change-speed transmission.

BRIEF DESCRIPTION OF THE DRAWINGS

Two embodiment examples of the disclosure are explained in greater detail below with reference to a drawing. In the drawing.

DETAILED DESCRIPTION

The embodiment examples explained below each relate to a shifting actuator 1, which is provided for use in a transmission, namely a double clutch transmission of a motor vehicle. FIGS. 1 to 7 show a first embodiment example, while FIGS. 8 to 14 show a second embodiment example of a shifting actuator 1. The overall construction of the shifting actuator 1 is shown diagrammatically in FIG. 8. The first embodiment example does not differ from this fundamental construction. Parts which correspond to one another or in principle act in the same way are provided with the same reference signs in all the figures. Unless stated otherwise, the following explanations relate to both embodiment examples.

Figure 8:
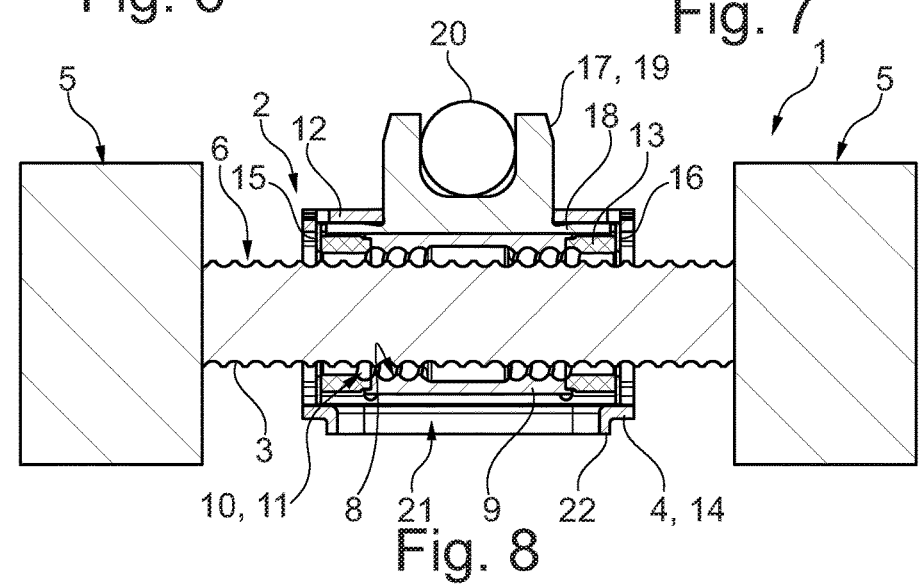
FIG. 8 shows a shifting actuator with a ball screw drive in a partially schematic illustration.
Figures 10, 11, 12:
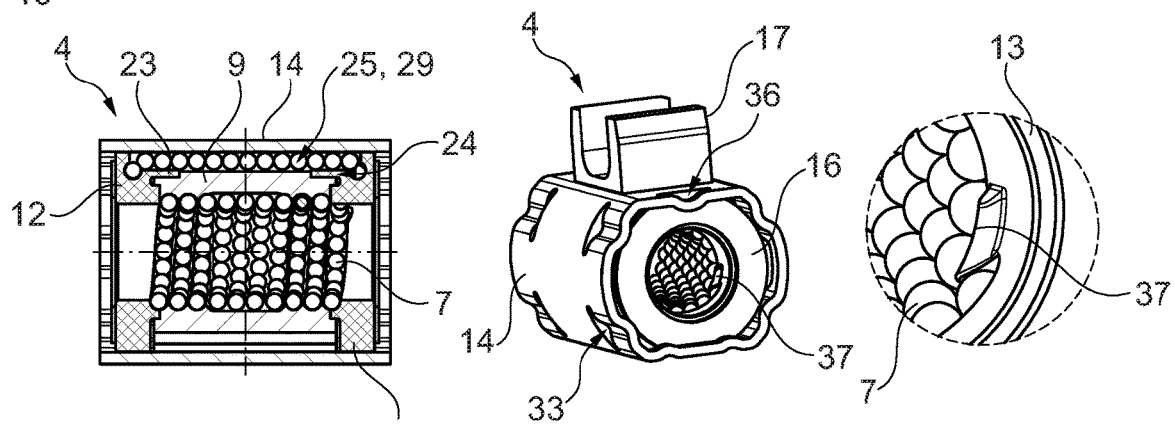
Figures 13, 14:
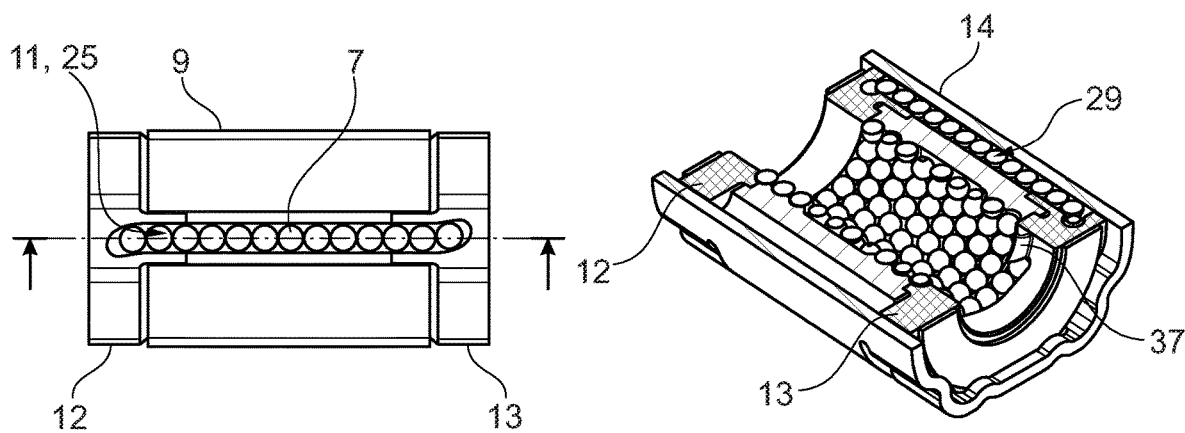

The shifting actuator 1 illustrated diagrammatically in FIG. 8 comprises a ball screw drive 2, which is constructed from a threaded spindle 3 and a spindle nut 4. The spindle nut 4 is mounted rotatably in two bearing points 5 illustrated only indicatively, which have rolling bearings, in particular ball bearings, for example. A ball groove 6, in which rolling elements, namely balls 7 of the kind that can be seen inter alia in FIG. 2 and in FIG. 10, is formed on the circumference of the threaded spindle 3. In the present cases, the thread described by the ball groove 6 is designed as a single-start thread.

A further ball groove 8, also referred to as a nut groove, is formed by a main nut body 9, which forms part of the spindle nut 4. A load section 10 of a closed ball channel, denoted overall by 11, is formed between the ball grooves 6, 8. The ball screw drive 2 is thus a rolling screw drive with rolling element recirculation.

The recirculation of the balls 7 is accomplished with the aid of two deflection components 12, 13, which adjoin the ends of the main nut body 9. In contrast to the main nut body 9, which is manufactured from metal, the deflection components 12, 13 are plastic parts.

The subassembly comprising the main nut body 9 and the deflection components 12, 13 is held in a sleeve 14. A disk 15, 16 is placed in front of each deflection component 12, 13 as a shim, which is likewise situated within the sleeve 14. A shift fork 17 is furthermore held by the sleeve 14, wherein a foot 18 of the shift fork 17 is situated within the sleeve 14, while a fork element 19 of the shift fork 17 protrudes from the sleeve 14. The shift fork 17 can be produced as a sintered part or as a rolled drawn profile. A transmission component 20, which can be a shift finger, a pin or a shaft, for example, is passed through the fork element 19, which provides two driving flanks.

A pocket 21, which extends in the longitudinal direction of the spindle nut 4 and of the threaded spindle 3, is formed by the sleeve 14 on the diametrically opposite side of said sleeve from the shift fork 17. A strip 22 describing the edge of the pocket 21 is formed integrally directly on the sleeve 14. The pocket 21 extends inward as far as the outer wall of the main nut body 9 in the radial direction of the spindle nut 4. The pocket 21 serves to secure the spindle nut 4 against rotation and limits an axial stroke with the aid of a pin that enters the pocket 21 and is preferably fixed in the transmission housing of the double clutch transmission.

Figure 1:
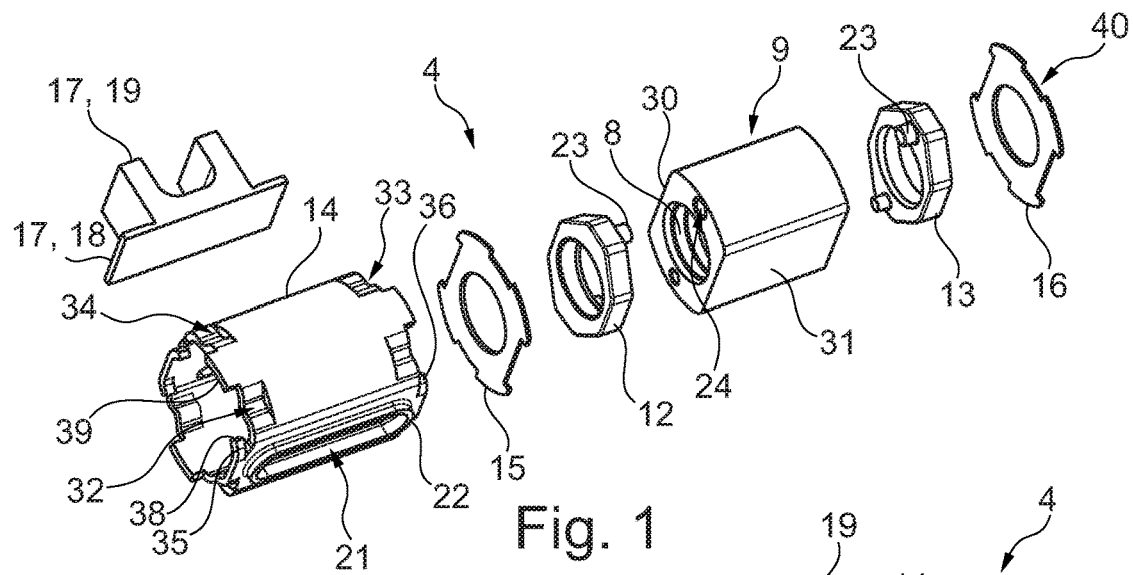
FIG. 1 shows a spindle nut for a ball screw drive of a shifting actuator in an exploded view.
Figure 2:
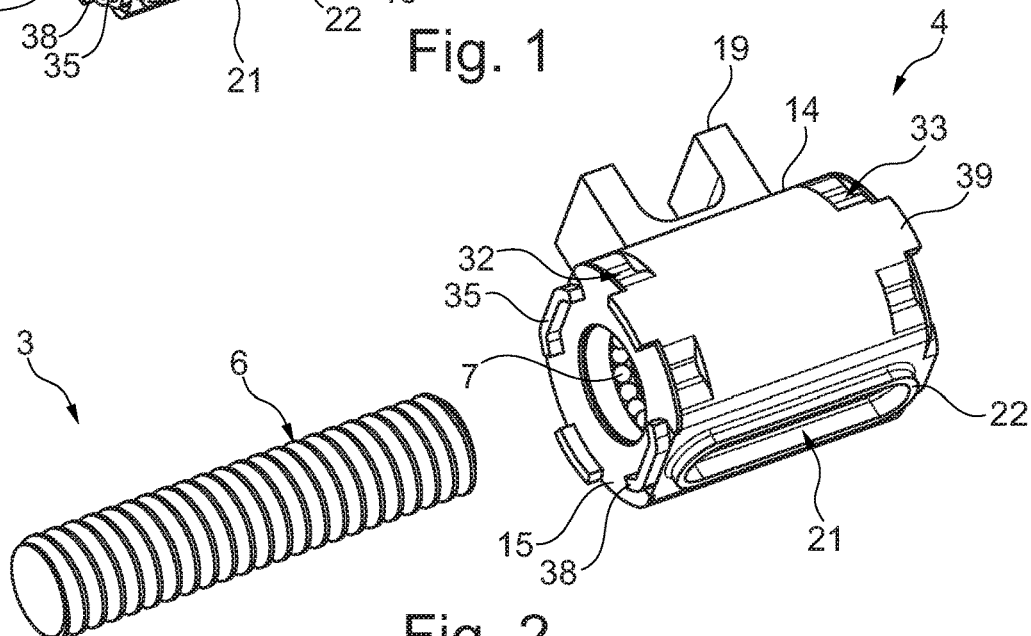
FIG. 2 shows the spindle nut with an associated threaded spindle and rolling elements in a perspective view.
Figure 3:
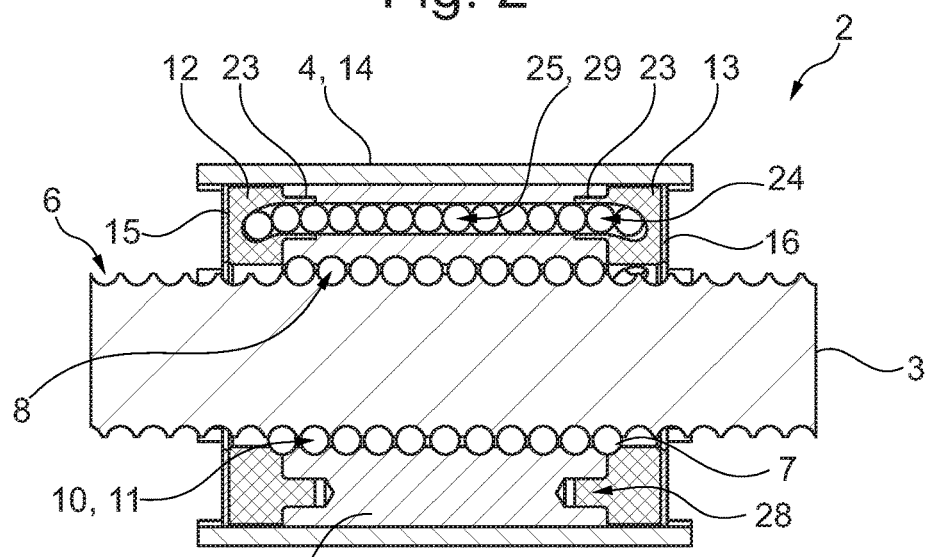
FIG. 3 shows the arrangement according to FIG. 2 in a state in which it has been assembled to form a ball screw drive, in section.
Figure 4:
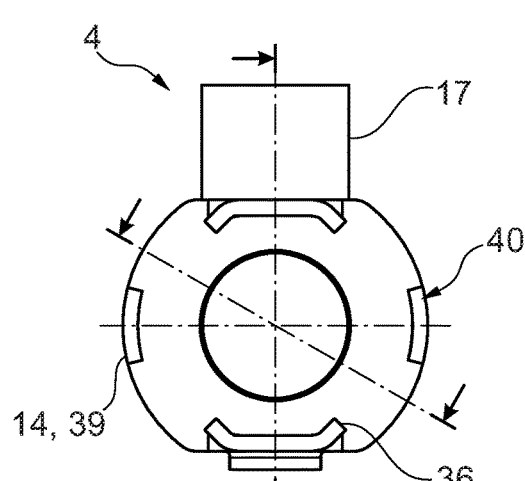
FIGS. 4 to 7 show, in various views, the spindle nut of the ball screw drive shown in FIG. 3.
Figure 5:
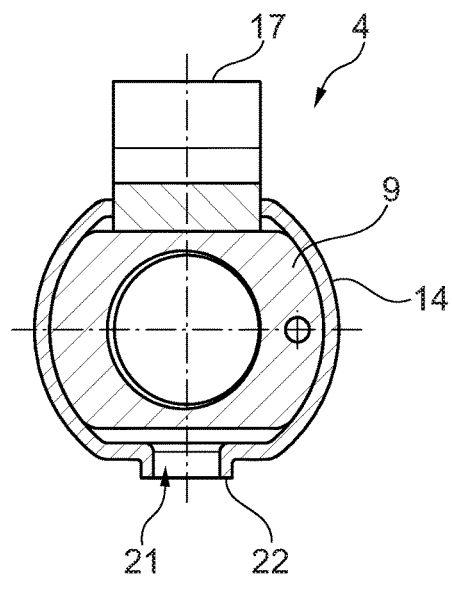
Figure 6:
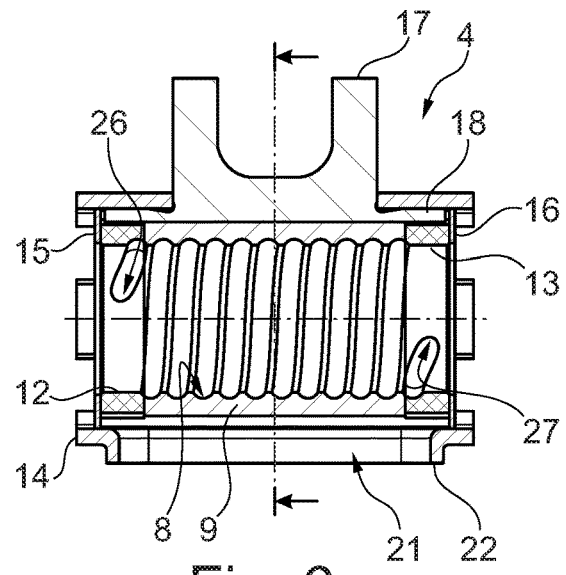
Figure 7:
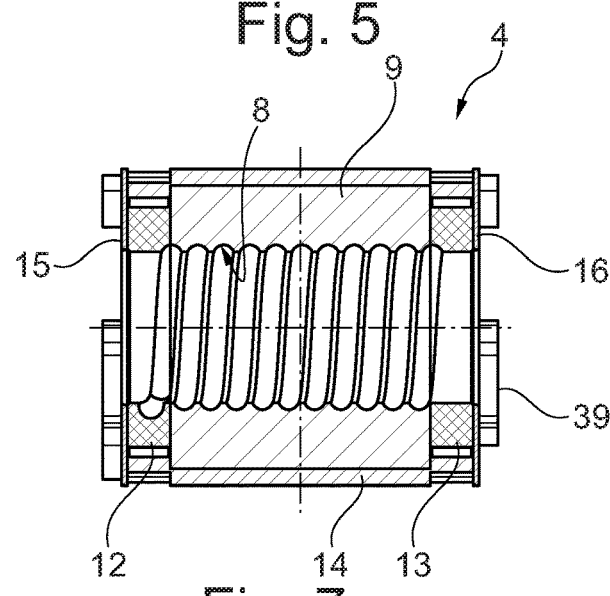
Figure 9:
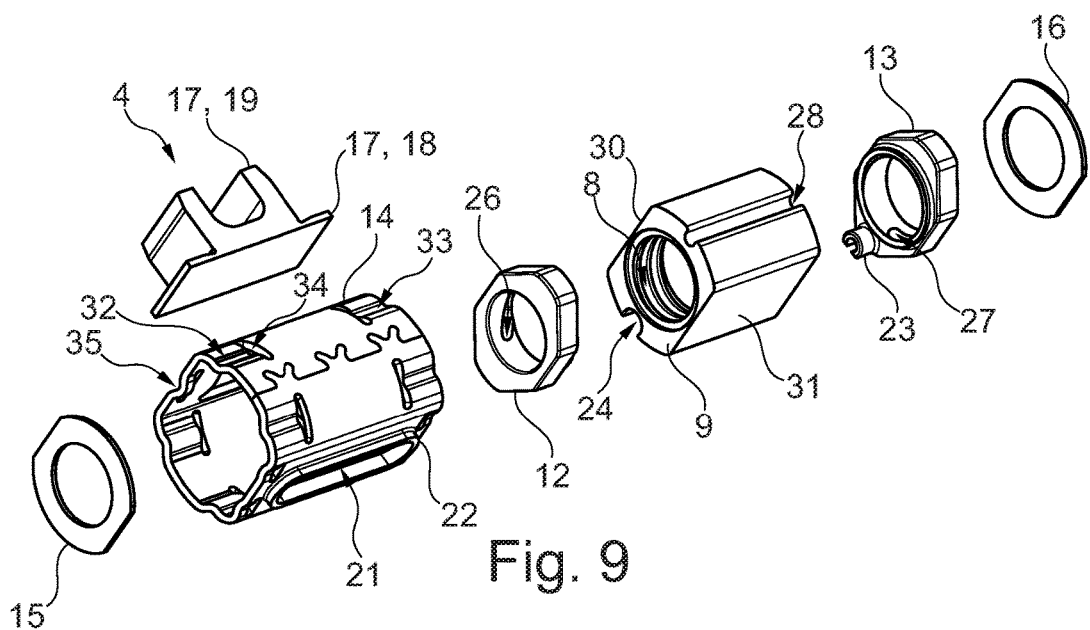
FIG. 9 shows the spindle nut of the shifting actuator shown in FIG. 8 in an illustration similar to FIG. 1, FIGS. 10 to 14 show further views of the spindle nut shown in FIG. 9, including the associated rolling elements.

As is apparent especially from FIG. 1 and from FIG. 9, each of the substantially annular deflection components 12, 13, which are also referred to as end deflectors, has an extension referred to as a deflection end 23, which extends in the axial direction of the spindle nut 4. When the spindle nut 4 is assembled, as can be seen inter alia in FIGS. 3 and 10, each deflection end 23 engages in a socket 24 in the main nut body 9. The two sockets 24 can be assigned to an elongate recess 25 which extends parallel to the center line of the main nut body 9 and hence of the entire spindle nut 4.

In the illustrative embodiment shown in FIGS. 1 to 7, the recess 25 is configured as a through hole in the main nut body 9. In the illustrative embodiment shown in FIGS. 8 to 14, on the other hand, the recess 25 is a longitudinal groove in the circumferential surface of the main nut body 9. The recess 25, which is open radially outward in this case, is covered by the sleeve 14 when the spindle nut 4 is fully assembled. In each case, therefore, a return section 29 with a closed cross section is formed as part of the ball channel 11.

The recess 25 is used for the recirculation of the balls and closes the ball channel 11 together with channel sections 26, 27 situated in the deflection components 12, 13. In addition to the recirculation groove 25, there are further recesses 28 in the various main nut bodies 9, but no balls run in said recesses in the cases under consideration. In the design of the main nut body 9 which can be seen in FIG. 3, the recesses 28 are designed as blind holes; in the case of FIG. 9, on the other hand, it is a matter of a longitudinal groove, comparable in principle with recess 25.

In each design, the main nut body 9 is designed as a substantially hollow cylindrical element with two flattened lateral surfaces 30, 31 parallel to one another. While the foot 18 of the shift fork 17 rests on the first lateral surface 30, the second lateral surface 31 is visible through the pocket 21. To match the bilaterally flattened shape of the main nut body 9, the sleeve 14 likewise has a bilaterally flattened shape, ensuring positive engagement between the main nut body 9 and the sleeve 14 in respect of relative rotations.

In the axial direction, the arrangement comprising the disks 15, 16, the deflection components 12, 13 and the main nut body 9 is likewise fixed solely by the sleeve 14 within the spindle nut 4. Four beads 32, 33 distributed over the circumference can be seen on each of the two ends of the sleeve 14. The beads 32, 33 are produced by deforming sections of the sleeve 14, which is designed overall as a sheet-metal part, wherein an offset, against which the main nut body 9 strikes in the axial direction of the spindle nut 4, is in each case formed at the ends of the beads 32, 33 remote from the end of the sleeve 14, i.e. adjacent to the central region of the spindle nut 4. In the region of said offsets, the material of the sleeve 14 is severed, wherein the parting line extends in the circumferential direction of the sleeve 14 and a slight opening 34 is left between this parting line and the bead 32, 33 extending in the axial direction of the sleeve 14.

The beads 32, 33 serve exclusively to fix the main nut body 9 in the sleeve 14 but not to fix the deflection components 12, 13. To hold the deflection components 12, 13, two holding sections 35, 36 that are bent radially inward are formed on the respective ends of the spindle nut 4.

In the embodiment shown in FIGS. 1 to 7, the holding sections 35, 36 have open end sections 38 which are bent obliquely inward in a radial direction and against which the associated disk 15, 16 forming a stop disk for one of the deflection components 12, 13 rests. In addition, two extensions 39 facing in the axial direction are formed respectively at both ends by the sleeve 14 in this embodiment, said extensions engaging in recesses 40 on the circumference of the disk 15, 16 and thus forming an anti-rotation safeguard between the disk 15, 16 and the sleeve 14.

An anti-rotation safeguard between the disks 15, 16, the sleeve 14 and the main nut body 9 is also provided in the design of the spindle nut 4 shown in FIGS. 8 to 14, which differs from the design shown in FIGS. 1 to 7 primarily in the fastening of the disks 15, 16 on the ends of the sleeve 14. In the embodiment shown in FIGS. 8 to 14, the holding sections 35, 36 are also referred to as cramps; in this case, they have the basic shape of beads, but these are significantly shorter than beads 32, 33.

Irrespective of the embodiment of the holding sections 35, 36, a disk 15, 16 rests against each of said sections, the disks in turn forming a stop element for a respective deflection component 12, 13. In a manner fundamentally comparable with the main nut body 9, the disks 15, 16 have a bilaterally flattened shape, ensuring that they are secured against rotation relative to the sleeve 14. The deflection components 12, 13 are likewise bilaterally flattened and therefore arranged in the sleeve 14 in a manner secured against rotation. A guide element 37 designed as an integral part of each deflection component 12, 13, which serves to guide balls 7 out of the ball channel 11 and recirculate balls 7 into the ball channel 11, is thus in an unchangeable position relative to the return section 29. The guide elements 37 ensure tangential ball takeoff within the ball screw drive 2. As viewed in the direction of the center line of the ball screw drive 2, the balls 7 are deflected by less than one eighth of a circle in each channel section 26, 27, which extends in each deflection component 12, 13 from the guide element 37 to the deflection end 23. Here, said circle relates to a turn which is concentric with the threaded spindle 3 and on which the balls 7 partially run.

In the production of the ball screw drive 2, a relatively long metal profile is first of all produced, the length of said profile corresponding to a multiple of the length of the main nut body 9 measured in the axial direction. This metal profile (not illustrated), which represents the starting material for the production of the main nut body 9, already has the recirculation groove 25 on its circumferential surface. The same applies to the two mutually parallel lateral surfaces 30, 31. The ball groove 8 is optionally also produced already in the relatively long metal profile. In the next step, the metal profile is divided into individual pieces, which each have the length of a main nut body 9. Expensive production of the return grooves 25 in the individual main nut bodies 9, e.g. by machining, is thus eliminated. All that is required is reworking of the main nut body 9, in particular the formation of the pockets 24 for the deflection ends 23 of the deflection components 12, 13. The main nut body 9 is then assembled to give the spindle nut 4, thus ensuring the permanent fixing of the deflection components 12, 13, of the shift fork 17 and of the main nut body 9 within the sleeve 14 exclusively by means of the sleeve 14 itself.

LIST OF REFERENCE SIGNS 1 shifting actuator
2 ball screw drive
3 threaded spindle
4 spindle nut
5 bearing point
6 ball groove
7 rolling element, ball
8 ball groove, nut thread
9 main nut body
10 load section
11 ball channel
12 deflection component
13 deflection component
14 sleeve
15 disk
16 disk
17 shift fork
18 foot
19 fork element
20 transmission component
21 pocket
22 strip
23 deflection end
24 pocket
25 recess
26 channel section
27 channel section
28 recess
29 return section
30 lateral surface
31 lateral surface
32 bead
33 bead
34 opening
35 holding section
36 holding section
37 guide element
38 end section
39 extension
40 aperture

The invention claimed is:

1. A shifting actuator for a transmission of a motor vehicle, comprising:
   a ball screw drive, including an electric-motor-driven threaded spindle and a multi-part spindle nut;
   the spindle nut including a sleeve, in which a main nut body provided with a ball groove is fixed and a shift fork protruding from the sleeve is fixed, wherein the shift fork and the main nut body are held in the sleeve by the sleeve.

2. The shifting actuator of claim 1, wherein the shift fork and the main nut body are fixed in the sleeve by positive engagement.

3. The shifting actuator of claim 2, wherein the main nut body is a dihedron.

4. The shifting actuator of claim 3, wherein a flat foot of the shift fork is placed on a lateral surface of the main nut body.

5. The shifting actuator of claim 4, wherein an elongate pocket extending in the longitudinal direction of the ball screw drive is formed by the sleeve on the lateral surface of the main nut body which faces away from the foot of the shift fork.

6. A shifting actuator for a transmission of a motor vehicle, comprising:
   a ball screw drive, including an electric-motor-driven threaded spindle and a multi-part spindle nut;
   the spindle nut including a sleeve, in which a main nut body provided with a ball groove is fixed and a shift fork protruding from the sleeve is fixed, wherein the ball screw drive is designed as a screw drive with ball recirculation, and the spindle nut comprises two annular deflection components arranged at the ends of the main nut body.

7. The shifting actuator of claim 6, wherein the deflection components and the main nut body rest flat against one another, and the deflection components do not project in the axial direction into the nut thread of the main nut body.

8. The shifting actuator of claim 6, wherein the main nut body, and the deflection components are held in the axial direction in the sleeve by separate deformation regions of said sleeve.

9. The shifting actuator of claim 8, wherein the deformation regions which hold the main nut body in the sleeve are more extended in the axial direction than the deformation regions which hold the deflection components in the sleeve.

* * * * *